US010285383B2

(12) United States Patent
Suh et al.

(10) Patent No.: US 10,285,383 B2
(45) Date of Patent: May 14, 2019

(54) EGG ORIENTING ASSEMBLY, AND ASSOCIATED SYSTEM, DEVICE AND METHOD

(71) Applicant: Zoetis Services LLC, Florham Park, NJ (US)

(72) Inventors: William Dongwook Suh, Cary, NC (US); Joseph Federowicz, Apex, NC (US)

(73) Assignee: Zoetis Services LLC, Parsippany, NJ (US)

( * ) Notice: Subject to any disclaimer, the term of this patent is extended or adjusted under 35 U.S.C. 154(b) by 137 days.

(21) Appl. No.: 15/212,464

(22) Filed: Jul. 18, 2016

(65) Prior Publication Data

US 2017/0020115 A1 Jan. 26, 2017

Related U.S. Application Data

(60) Provisional application No. 62/194,933, filed on Jul. 21, 2015.

(51) Int. Cl.
*A01K 43/00* (2006.01)
*A01K 45/00* (2006.01)
(Continued)

(52) U.S. Cl.
CPC ............ *A01K 43/00* (2013.01); *A01K 45/007* (2013.01); *B65B 23/06* (2013.01); *B65B 23/08* (2013.01)

(58) Field of Classification Search
CPC ...... A01K 43/00; A01K 45/007; B65B 23/06; B65B 23/08
(Continued)

(56) References Cited

U.S. PATENT DOCUMENTS 879,801 A * 2/1908 Swanson ................ B65B 23/08 294/87.12
1,500,939 A 7/1924 Howell
(Continued)

FOREIGN PATENT DOCUMENTS

EP 0351022 A1 1/1990
EP 1118267 A1 7/2001
(Continued)

OTHER PUBLICATIONS

PCT International Search Report and Written Opinion, International Filing Date Jul. 19, 2016; International Application No. PCT/US2016/042885, dated Dec. 8, 2016.

*Primary Examiner* — Joshua D Huson
(74) *Attorney, Agent, or Firm* — Scott C. Mayhew

(57) ABSTRACT

An egg processing system is provided. Such a system includes a reference platform defining a plurality of reference openings therethrough. Each reference opening is adapted to receive an avian egg therein from an underside of the reference platform. A plurality of egg holders are provided for supporting eggs, each egg holder being configured to lift an egg toward a respective reference opening. A plurality of egg orienting accommodations extends from the underside of the reference platform. Each egg orienting accommodation is associated with a respective reference opening such that as an egg moves toward the reference platform it interacts with the egg orienting accommodation to orient the egg. An associated system, device and method are also provided.

10 Claims, 13 Drawing Sheets

100 160 165 200 162 210 140 5 110 125 20 120 142 130

(51) Int. Cl.
*B65B 23/06* (2006.01)
*B65B 23/08* (2006.01)

(58) Field of Classification Search
USPC .......................................................... 119/6.8
See application file for complete search history.

(56) References Cited

U.S. PATENT DOCUMENTS 2,177,595 A 10/1939 Freed
2,666,665 A 1/1954 Whitcher et al.
2,792,253 A 5/1957 Bliss
3,377,989 A 4/1968 Sandhage et al.
3,478,862 A * 11/1969 Niederer ................ A01K 43/00 198/389
3,616,262 A * 10/1971 Coady .................. A47J 43/145 134/48
4,040,388 A * 8/1977 Miller .................. A01K 45/007 119/6.8
4,302,142 A 11/1981 Kuhl et al.
4,396,109 A 8/1983 Nambu
4,469,047 A 9/1984 Miller
4,505,373 A 3/1985 Thomas
4,519,494 A 5/1985 McEvoy et al.
4,553,661 A * 11/1985 van der Schoot ...... B65B 23/06 198/428
4,569,444 A 2/1986 McEvoy et al.
4,593,646 A 6/1986 Miller et al.
4,709,713 A 12/1987 Kuhl
4,843,958 A 7/1989 Egosi
4,928,628 A * 5/1990 Gassman ............. A01K 43/005 119/6.8
5,101,954 A 4/1992 Nambu
5,136,979 A 8/1992 Paul et al.
5,158,038 A 10/1992 Sheeks et al.
5,167,317 A 12/1992 van der Schoot et al.
6,000,526 A 12/1999 van Veldhuisen et al.
6,309,001 B1 * 10/2001 Sherwin .................. A21C 9/08 294/100
6,343,688 B1 2/2002 McKinlay
6,527,498 B2 * 3/2003 Chalker, II ............. A01K 41/06 119/6.5
6,601,533 B1 8/2003 Bounds, Jr.
6,811,017 B1 11/2004 Gross et al.
6,981,470 B2 1/2006 Gross et al.
7,041,439 B2 * 5/2006 Phelps .................. A01K 45/00 435/4
7,261,053 B2 8/2007 Karaca et al.
7,430,987 B2 10/2008 Smith
7,438,019 B2 * 10/2008 Lofink, Jr. ........... A01K 45/007 119/6.8
7,503,279 B2 * 3/2009 Correa ................. A01K 45/007 119/6.8
7,721,674 B2 5/2010 Smith
8,585,109 B2 11/2013 Chen et al.
9,522,808 B2 12/2016 Suh
2002/0023591 A1 * 2/2002 Bounds, Jr. ............ A01K 43/00 119/6.8
2002/0150460 A1 * 10/2002 Chalker, II ............. A01K 41/06 414/781
2003/0056729 A1 * 3/2003 Correa ................. A01K 45/007 119/6.8
2004/0107912 A1 * 6/2004 Hebrank ................ A01K 43/00 119/6.8
2004/0139989 A1 7/2004 Ilich
2004/0144324 A1 * 7/2004 Gross .................. A01K 45/007 119/6.8
2008/0202427 A1 * 8/2008 Correa ................. A01K 45/007 119/6.8
2010/0292834 A1 11/2010 Mirandola
2015/0272085 A1 * 10/2015 Suh ....................... A01K 45/00 211/14
2016/0007575 A1 * 1/2016 Hessler ................ A01K 45/007 119/6.8
2016/0302395 A1 * 10/2016 Adjanohoun .......... A01K 41/06

FOREIGN PATENT DOCUMENTS

EP 1344728 A1 9/2003
GB 689173 3/1953
WO WO 88/01924 A1 3/1988
WO WO 02/082890 A2 10/2002
WO WO 03/094607 A1 11/2003
WO WO 2003/096028 A2 11/2003
WO WO 2013/152970 A2 10/2013
WO WO 2014/064727 A1 5/2014
WO WO 2015/037995 A1 3/2015
WO WO 2015/044547 A1 4/2015

* cited by examiner

EGG ORIENTING ASSEMBLY, AND ASSOCIATED SYSTEM, DEVICE AND METHOD

CROSS REFERENCE TO RELATED APPLICATION

This application claims the benefit of U.S. Provisional Patent Application No. 62/194,933, filed Jul. 21, 2015, which is expressly incorporated herein by reference in its entirety.

TECHNICAL FIELD

The present disclosure generally relates to egg processing devices and systems. More particularly, the present disclosure relates to an assembly for orienting eggs with respect to a longitudinal axis thereof prior to a processing event, and an associated system and method.

BACKGROUND

Avian eggs may be processed for various reasons. Such processing may include, for example, injection of vaccines, sampling of material, removal or transfer, decapping, or harvesting of internal fluids, among other things. For processing, eggs are typically carried in an egg container having a plurality of individual compartments configured to receive an egg in an upright secure position. The egg container is transported to a processing apparatus where the eggs are subjected to a processing event. In some instances, the eggs may be lifted out of the egg container from below (supported) prior to undergoing the processing event. In other instances, the eggs may remain positioned within the egg container during the processing event. In either case, the eggs may be presented to the processing apparatus in a tilted manner, wherein the eggs may not be presented for processing in a completely vertical position. That is, one or more eggs may be off-axis with respect to the longitudinal axis of the egg which extends through the ends thereof. It may be desirable in some instances to align or otherwise straighten the eggs such that the longitudinal axis of each egg is vertical prior to undergoing the processing. Still, in other instances, it may be desirable to orient the eggs off-axis or away from vertical orientation.

Accordingly, it would be desirable to provide an assembly and associated system capable of orienting eggs such that the longitudinal axis of each egg is oriented accordingly prior to undergoing the processing. Furthermore, it would be desirable to provide an associated method to facilitate orienting of eggs prior to undergoing a processing event. Additionally, it would be desirable to provide an assembly, system and method capable of accommodating various sized eggs for optimizing the processing thereof.

BRIEF SUMMARY

The above and other needs are met by aspects of the present disclosure which, according to one aspect, provides an egg processing system having a reference platform defining a plurality of reference openings therethrough, each reference opening being adapted for receiving at least a portion of an avian egg therein from an underside of the reference platform. A plurality of egg holders are provided for supporting eggs, each egg holder being configured to lift an egg toward a respective reference opening. A plurality of egg orienting accommodations extends from the underside of the reference platform. Each egg orienting accommodation is associated with a respective reference opening such that as an egg moves toward the reference platform it interacts with the egg orienting accommodation to orient the egg.

Another aspect provides a method for processing an avian egg. The method comprises positioning a plurality of avian eggs beneath a reference platform defining a plurality of reference openings therethrough, the reference platform having a plurality of egg orienting accommodations extending from the underside of the reference platform. The method further comprises lifting each avian egg to the reference platform with an egg holder such that each reference opening receives an avian egg therein from an underside of the reference platform. The method further comprises orienting the eggs to a predetermined orientation as the eggs interact with the egg orienting accommodations and contact the reference platform, and processing the avian eggs.

Yet another aspect provides an egg processing system having a frame. A reference platform defines a plurality of reference openings therethrough and is operably engaged with the frame. Each reference opening is adapted to receive at least a portion of an avian egg therein from an underside of the reference platform. A plurality of egg holders are operably engaged with the frame and have supports for supporting eggs. Each egg holder is configured to lift an egg to a respective reference opening, each egg holder being configured to self-adjust its height based on the size of the egg being lifted to the reference opening. Each egg holder has a locking assembly configured to lockingly secure the egg holder in position for processing once the holder has self-adjusted.

Still another aspect provides an invasive egg processing device. The device has a body having a proximal end and a distal end. A needle is operably engaged with the body. The needle is capable of extending and retracting at the distal end of the body for invasively interacting with an egg. An egg orienting accommodation is operably engaged with the body at the distal end thereof. The egg orienting accommodation is configured to interact with an egg so as to orient the egg.

Thus, various aspects of the present disclosure provide advantages, as otherwise detailed herein.

BRIEF DESCRIPTION OF THE DRAWINGS

Figure 1:
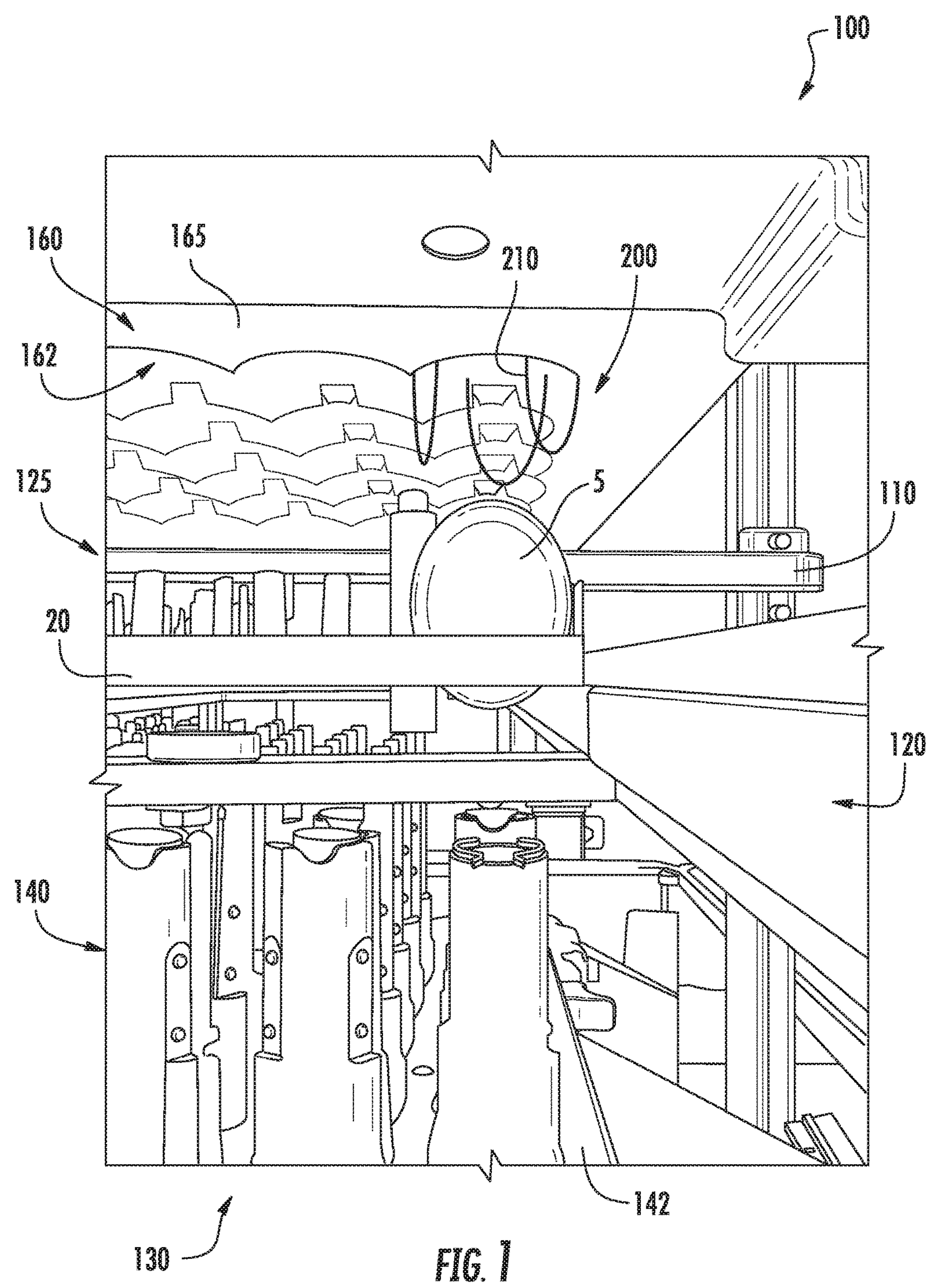
Figure 2:
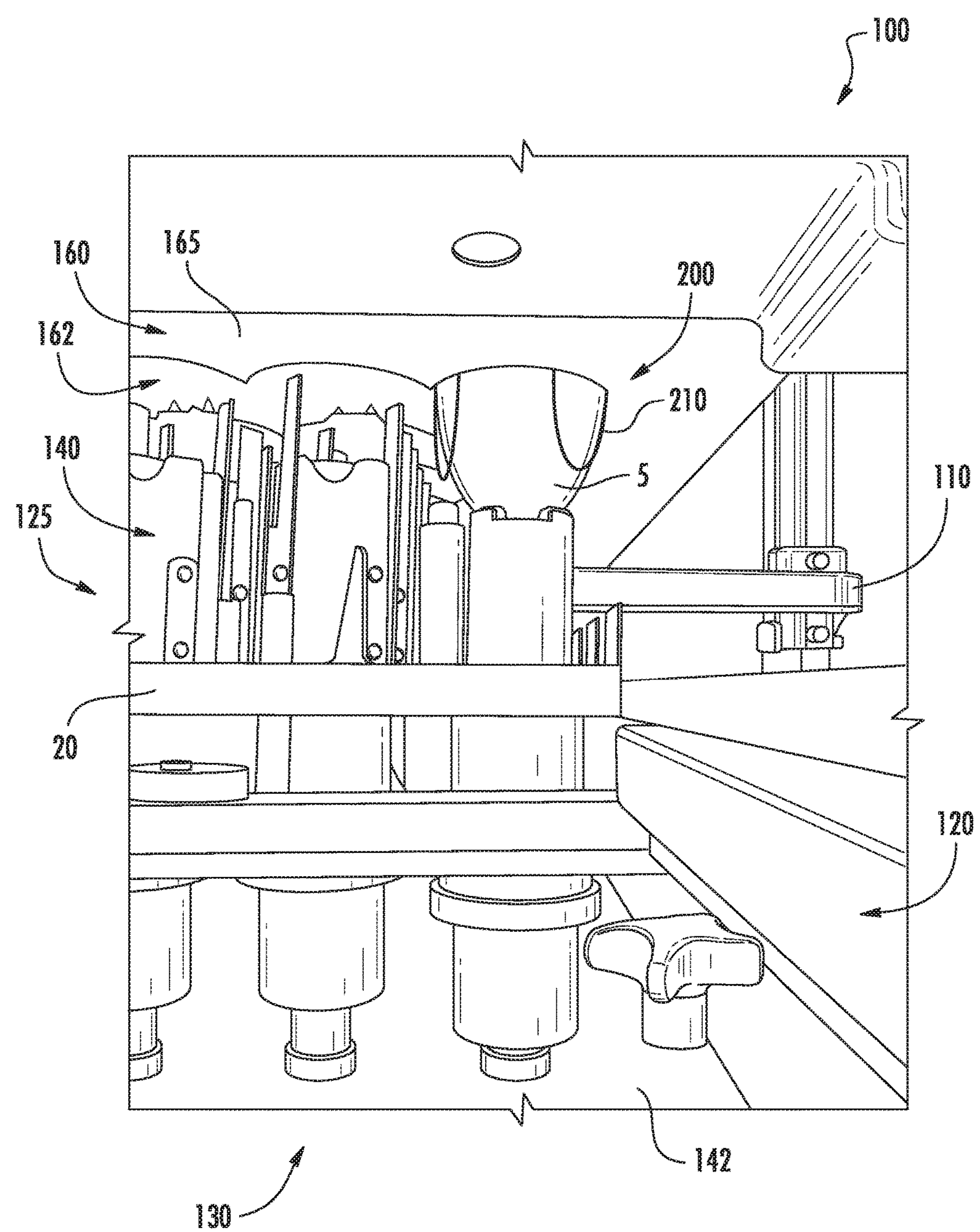
Figure 3:
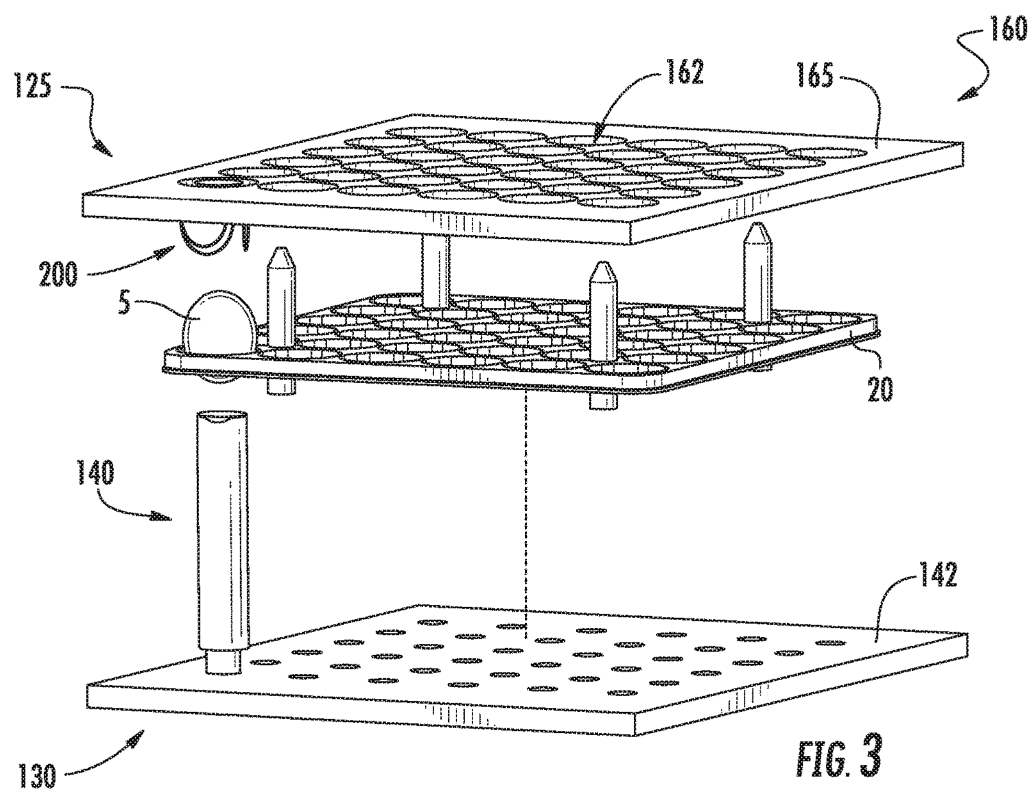
Figure 4:
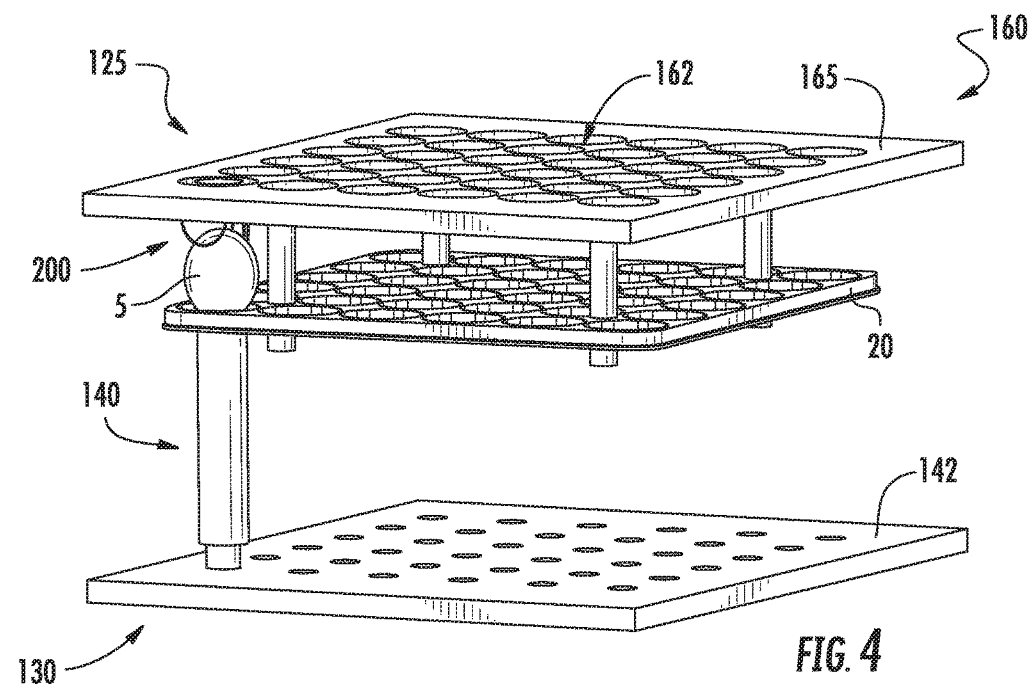
Figure 5:
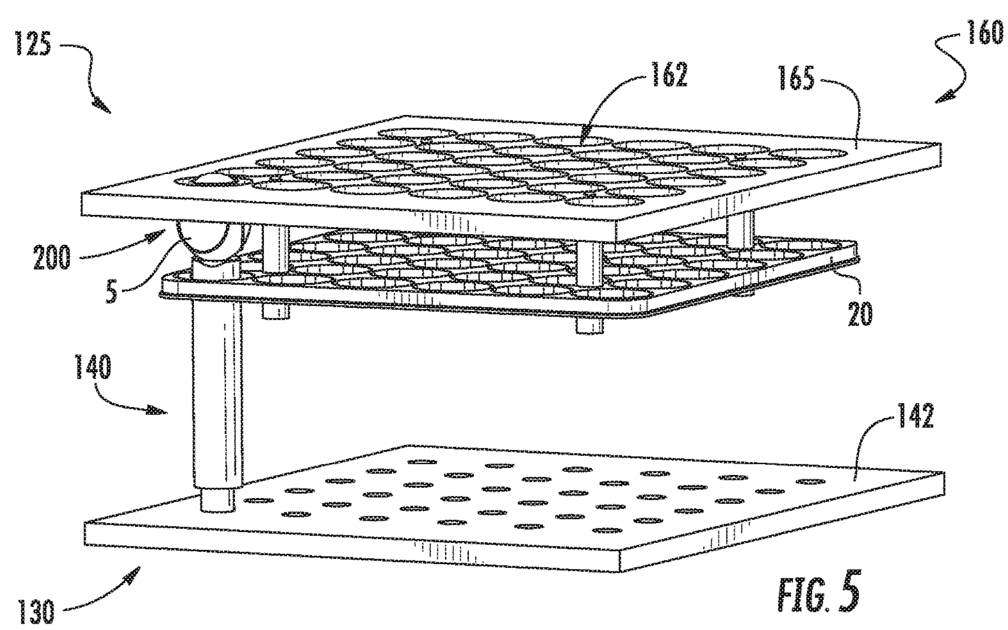
Figure 6:
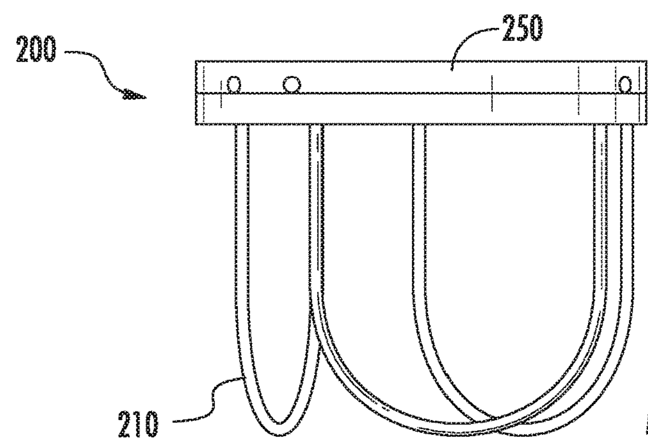
Figure 7:
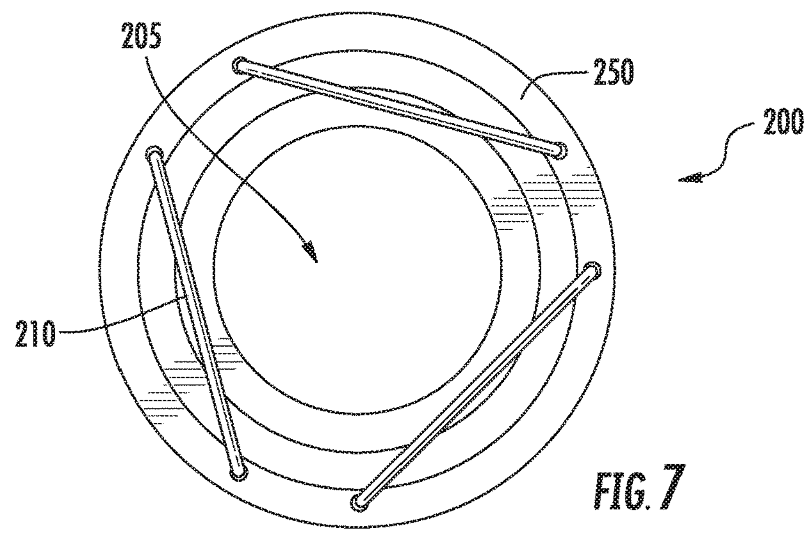
Figure 8:
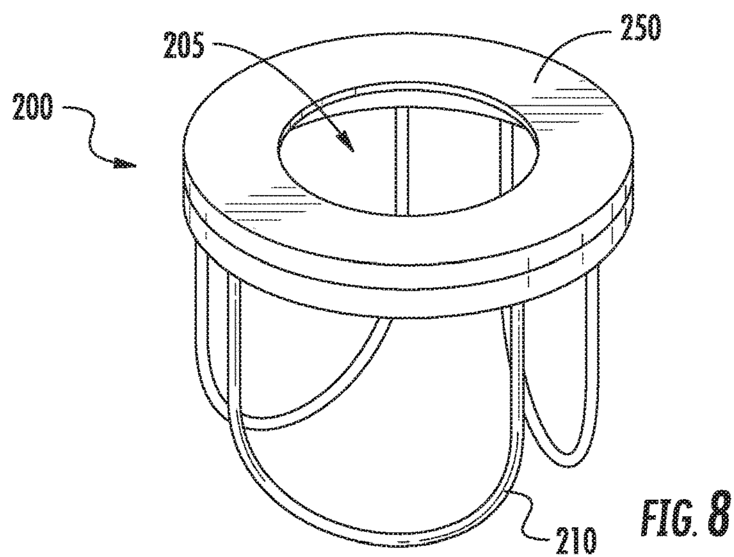
Figure 9:
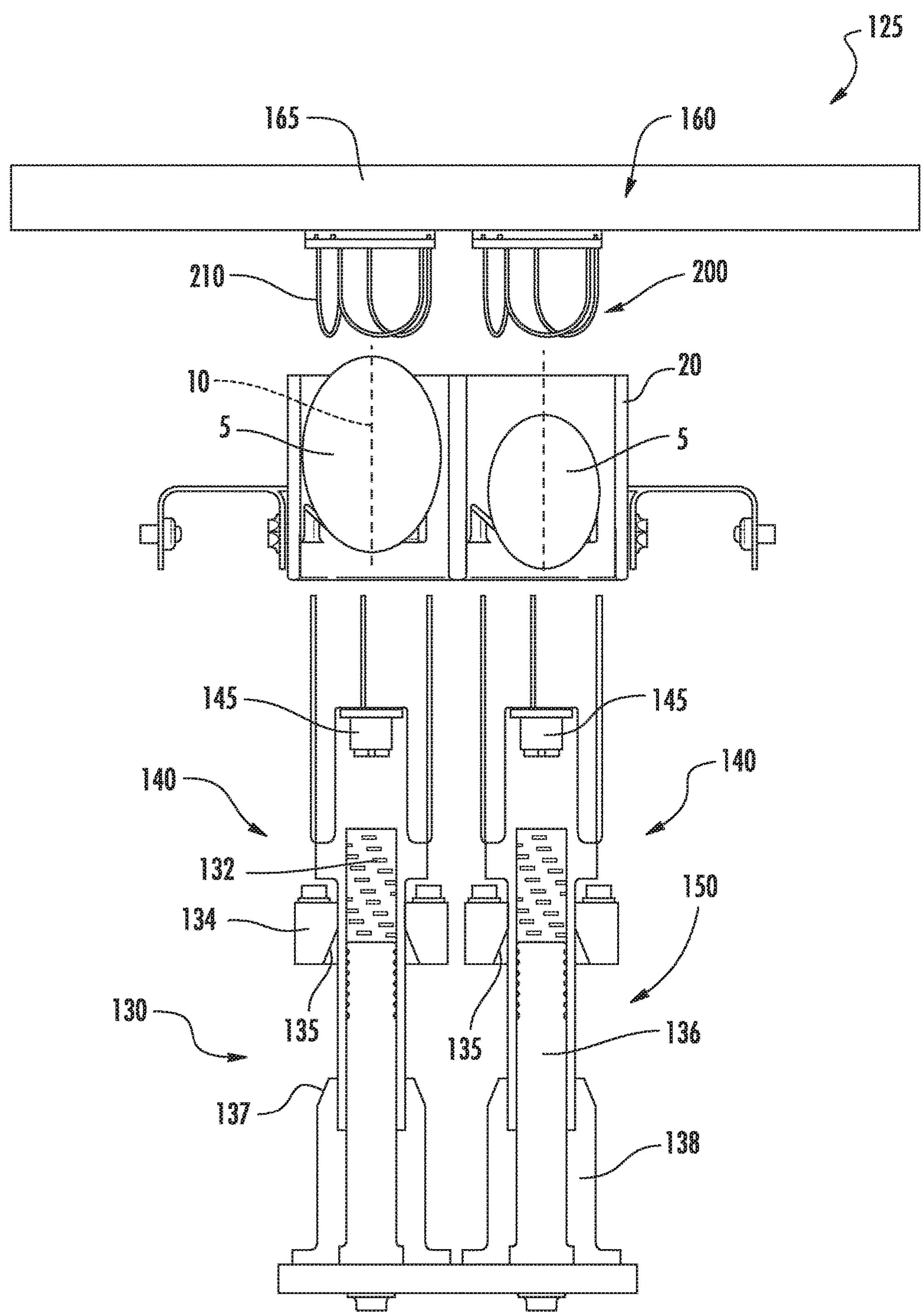
Figure 10:
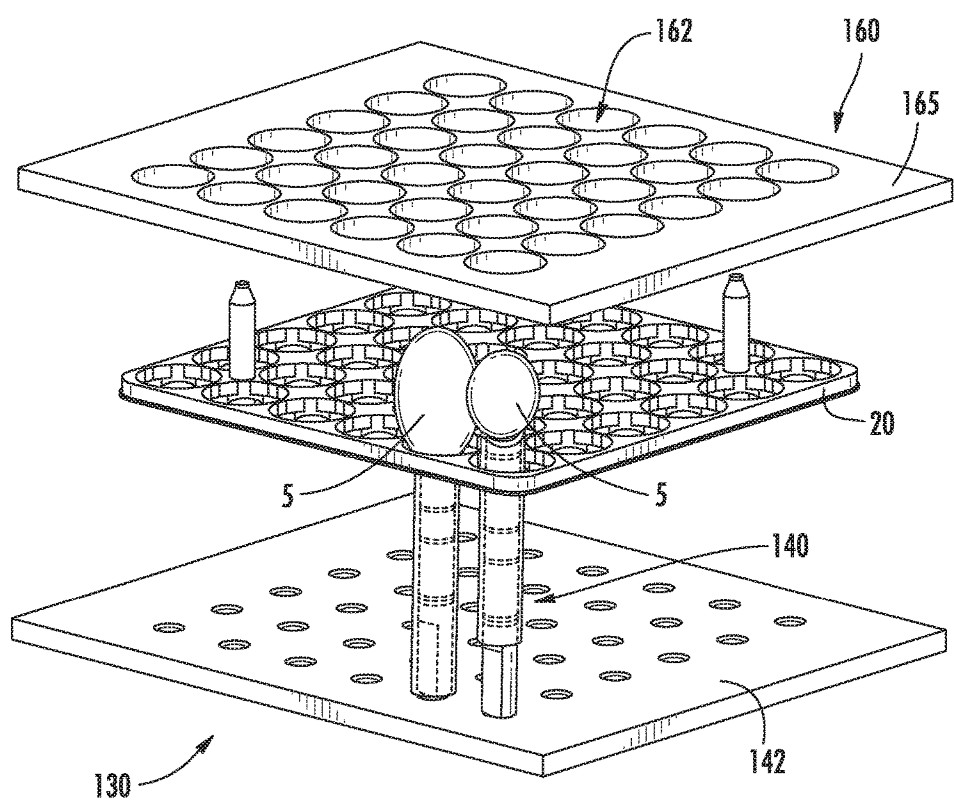
Figure 11:
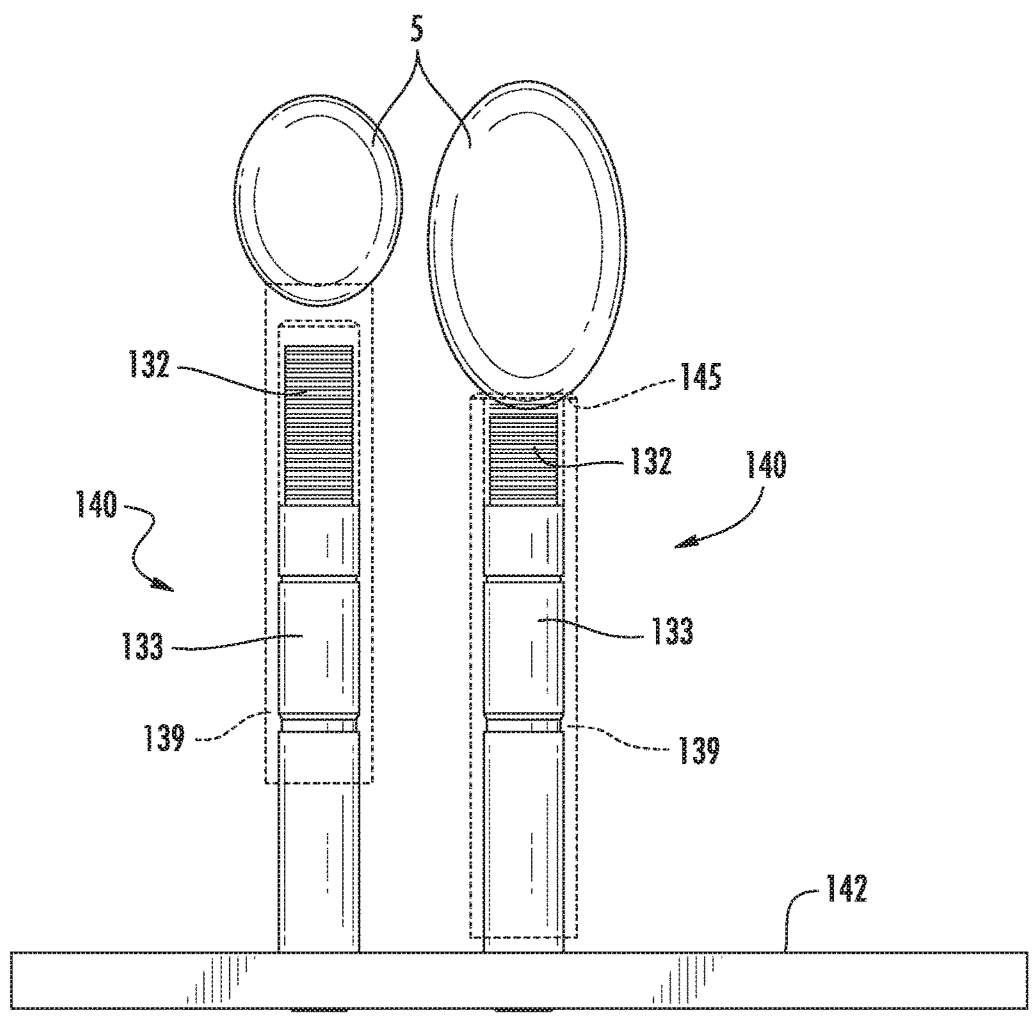
Figure 12:
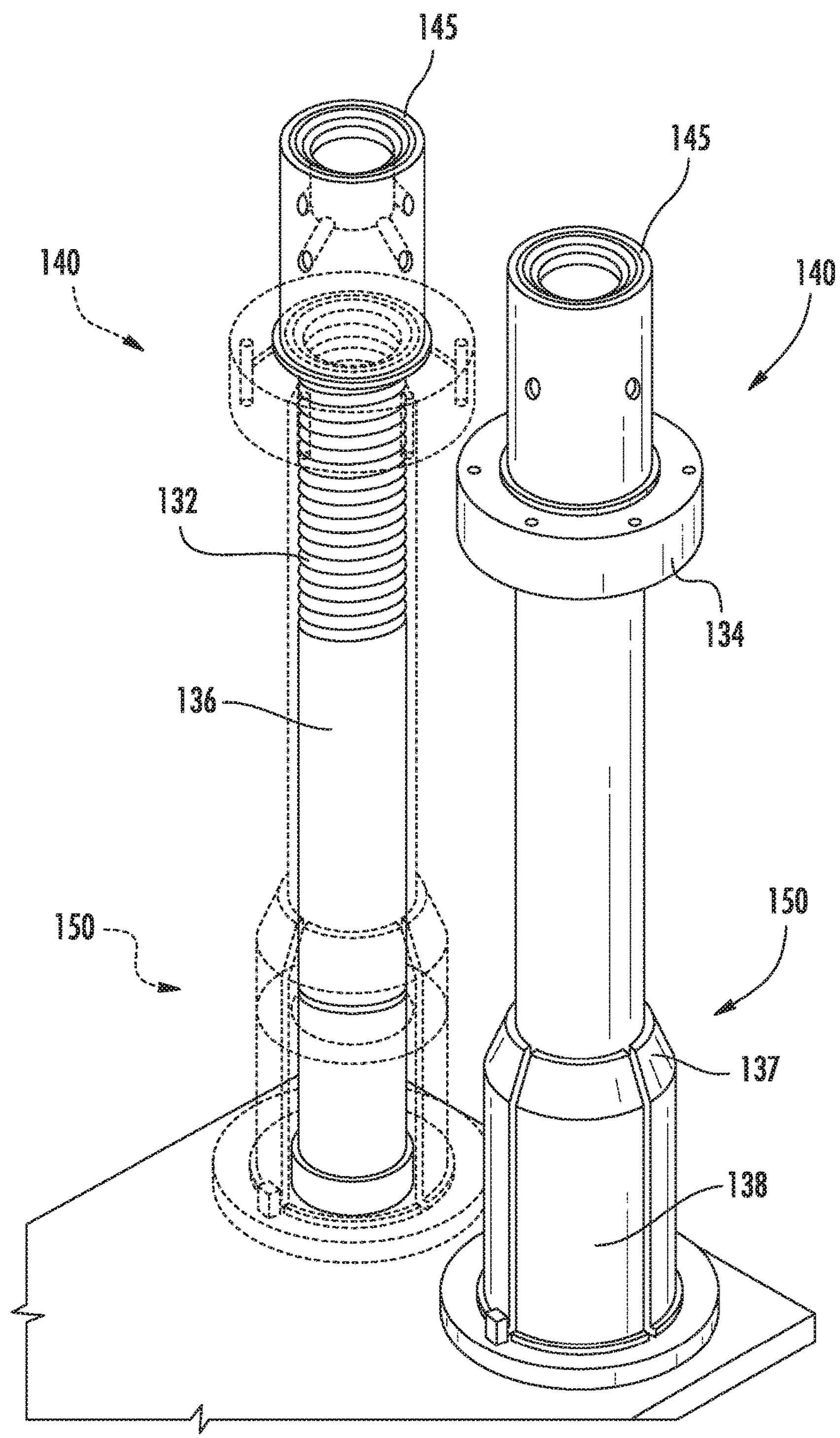
Figure 13:
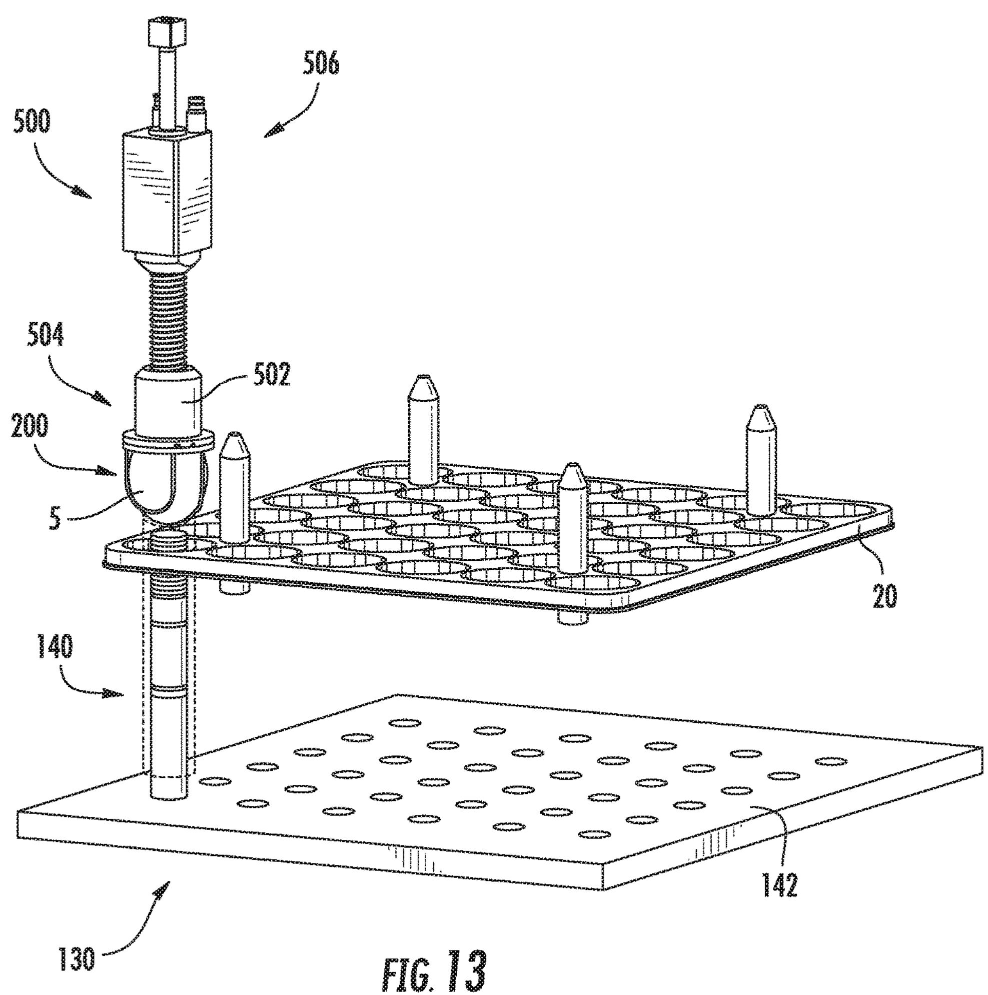
Figure 14:
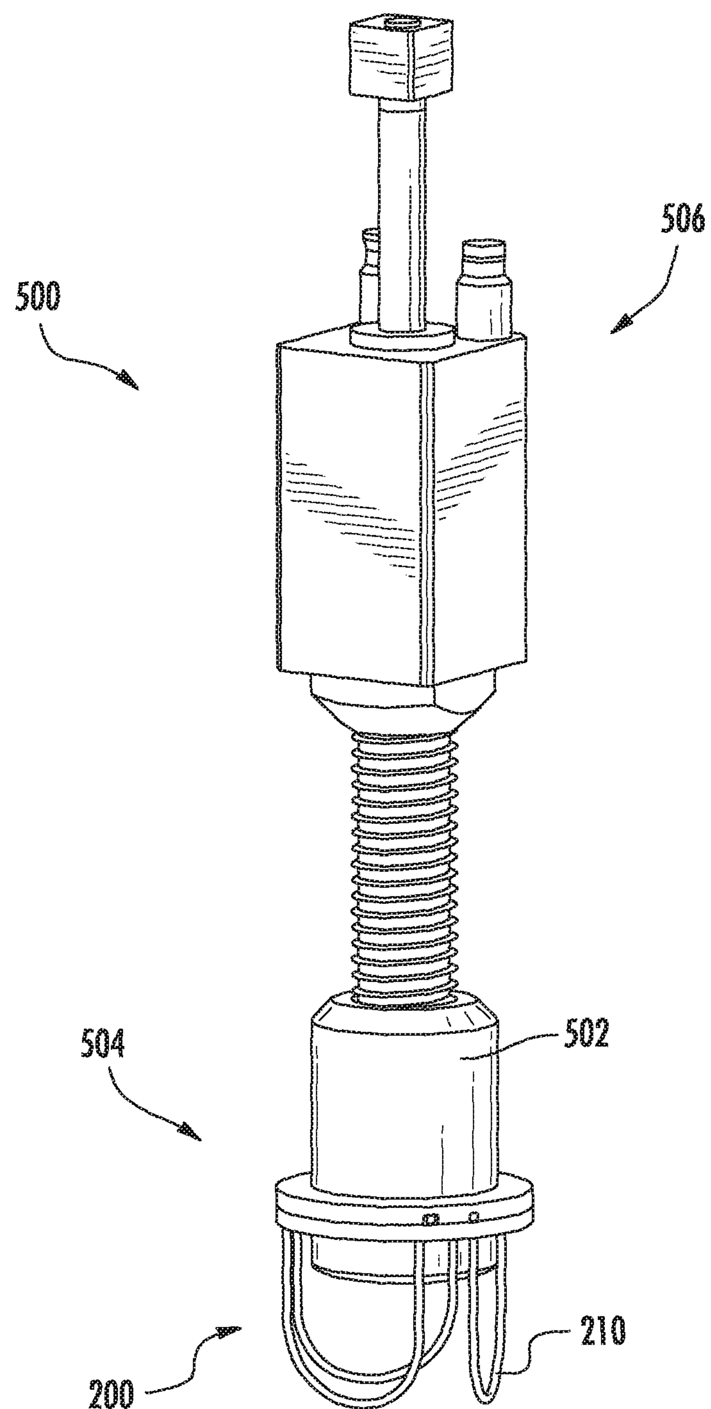
Figure 17:
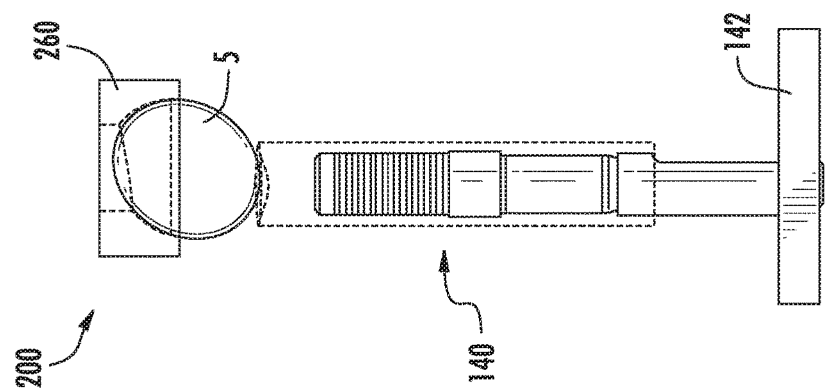
Figure 16:
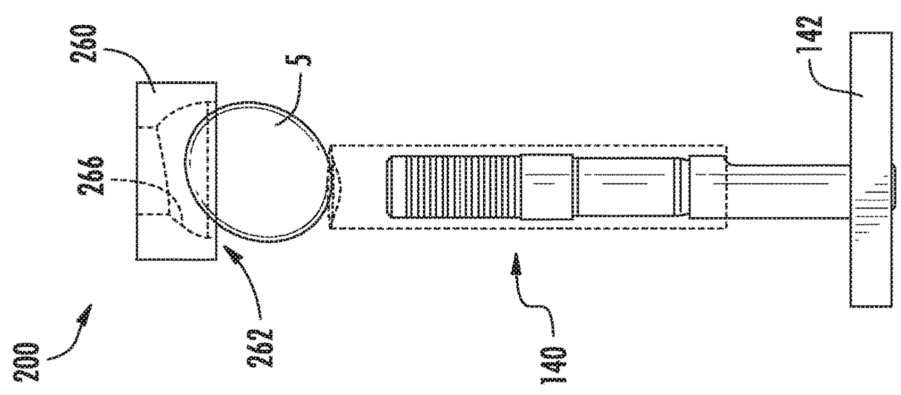
Figure 15:
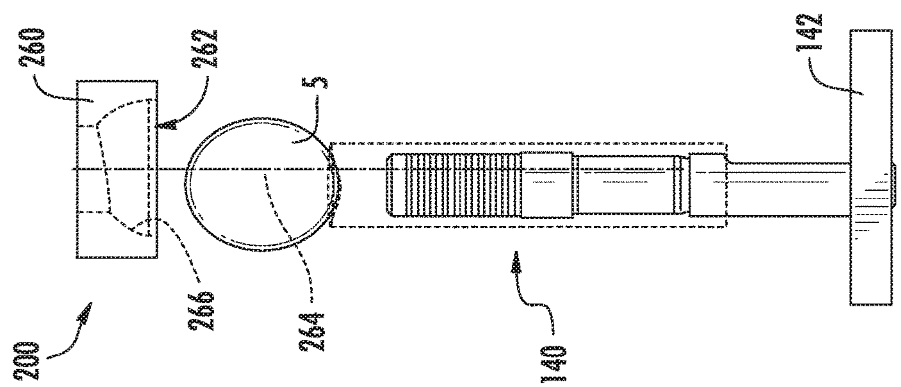
Figure 18:
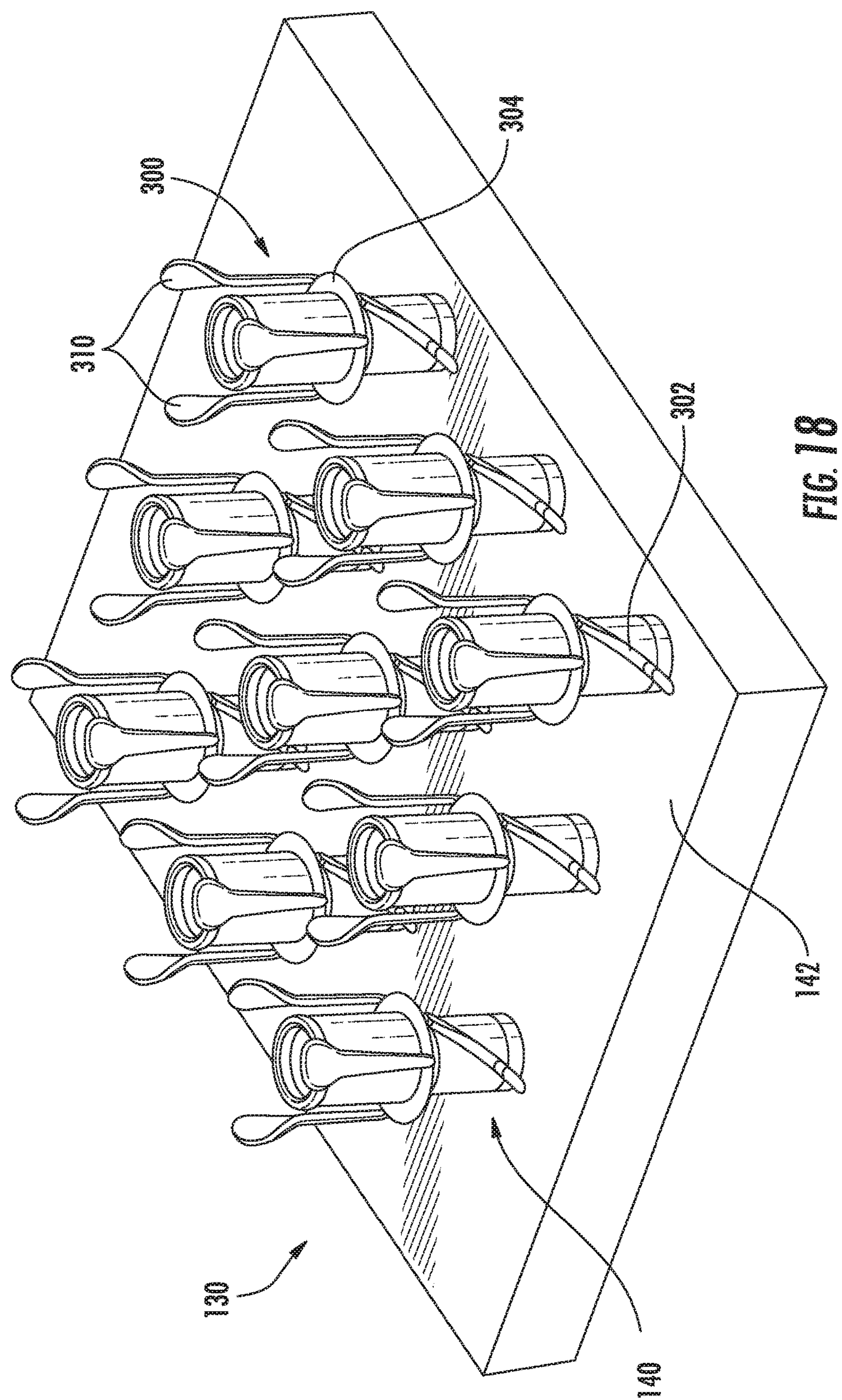

Having thus described various embodiments of the present disclosure in general terms, reference will now be made to the accompanying drawings, which are not necessarily drawn to scale, and wherein:

FIG. 1 is a partial side view of an egg processing system having an egg orienting assembly capable of vertically orienting eggs for processing, according to one aspect of the present disclosure, and illustrating an egg positioned within an egg flat container;

FIG. 2 is a partial side view of an egg processing system having an egg orienting assembly capable of vertically orienting eggs for processing, according to one aspect of the present disclosure, and illustrating an egg lifted out of an egg flat container to interact with an egg orienting accommodation extending from a reference platform;

FIGS. 3-5 are perspective schematic views of an egg orienting assembly, illustrating the sequential operation thereof, according to one aspect of the present disclosure;

FIGS. 6-8 are various perspective schematic views of an egg orienting accommodation capable of being implemented on an egg processing system, according to one aspect of the present disclosure;

FIG. 9 is a schematic view of a self-adjusting egg support assembly implemented as part of an egg orienting assembly, according to one aspect of the present disclosure;

FIG. 10 is a perspective schematic view of an egg orienting assembly, illustrating eggs of various sizes being lifted by self-adjusting egg holders, according to one aspect of the present disclosure;

FIG. 11 is a side schematic view of an egg support assembly, illustrating eggs of various sizes being lifted by self-adjusting egg holders, according to one aspect of the present disclosure;

FIG. 12 is a perspective schematic view of an egg support assembly having a locking assembly, according to one aspect of the present disclosure;

FIG. 13 is a perspective schematic view of an egg orienting assembly having an egg orienting accommodation positioned on an invasive egg processing device, according to one aspect of the present disclosure;

FIG. 14 is a perspective schematic view of an invasive egg processing device having an egg orienting accommodation positioned at one end thereof, according to one aspect of the present disclosure;

FIGS. 15-17 are various side schematic views of an egg orienting assembly, illustrating sequential operation of an egg support assembly raising an egg upwardly to an egg orienting accommodation for interaction therewith such that the egg is oriented off-axis with respect to vertical, according to one aspect of the present disclosure; and FIG. 18 is a perspective schematic view of an egg support assembly having a plurality of support extensions configured to rotate the egg as it is lifted from an egg flat.

DETAILED DESCRIPTION OF THE DISCLOSURE

Various aspects of the present disclosure now will be described more fully hereinafter with reference to the accompanying drawings, in which some, but not all aspects of the disclosure are shown. Indeed, this disclosure may be embodied in many different forms and should not be construed as limited to the aspects set forth herein; rather, these aspects are provided so that this disclosure will satisfy applicable legal requirements. Like numbers refer to like elements throughout.

Aspects of the present disclosure may be implemented on various egg processing systems. For example, such aspects may be implemented on an egg injection module (e.g., injection of a treatment substance), an egg sampling module (e.g., removal of material for diagnostic testing), and an egg decapping module (e.g., removal of egg cap to harvest internal fluids), among others. In this regard, aspects of the present disclosure may generally be used as an aid to present an egg in a vertical orientation for processing.

As shown in FIGS. 1 and 2, an egg processing system 100 may be particularly adapted for use in processing eggs positioned within an egg flat container 20, which includes a plurality of open-ended receptacles for individually receiving the eggs. Examples of suitable commercial egg flat containers 20 include, but are not limited to, a "CHICK-MASTER 54" flat, a "JAMESWAY 42" flat and a "JAMESWAY 84" flat (in each case, the number indicates the number of eggs carried by the flat). Using the egg processing system 100, the eggs may be processed when positioned below an egg processing head.

According to some aspects, the egg processing system 100 may include a frame 110 and a conveyor assembly provided to move the egg flat containers 20 in an automated manner through the egg processing system 100 to a processing position. The conveyor assembly may include a guide rail system 120 configured to receive and guide the egg flat containers 20 to the processing position. The conveyor assembly may further include appropriate stop elements, sensors, belts, endless loops, motors, etc. for proper indexing and positioning of the egg flat containers 20 within the egg processing system 100. In some instances, the egg flat containers 20 may be manually advanced through the egg processing system 100.

As shown in FIGS. 1-4, the egg processing system 100 may include an egg orienting assembly 125. In some instances, the egg orienting assembly 125 may have an egg support assembly 130 provided to lift and support each egg out of the egg flat container 20 once positioned under the egg processing head and prior to processing. In this regard, it may be preferable to support the egg during processing so as to limit cracking of the eggs, which may occur if the eggs are maintained within the egg flat container 20. The egg support assembly 130 may capable of moving between an operative position (supporting the eggs as lifted from the egg flat container 20), as shown in FIGS. 2, 4 and 5, and a retracted position (non-supporting position that allows vertical clearance between the egg support assembly 130 and the egg flat container 20), as shown in FIGS. 1 and 3. In the operative position, eggs may be appropriately positioned for processing.

In some instances, the egg support assembly 130 may include a plurality of egg holders 140 for lifting the eggs from the egg flat container 20. Each egg holder 140 may have a support member 145 that contacts and engages one end of the egg so as to provide support thereto during processing. The egg holders 140 may be individually actuatable such that the eggs may be selectively presented for processing. In other instances, the egg holders 140 may be commonly raised by, for example, a support plate 142 connected therewith such that all eggs within the egg flat container 20 are lifted therefrom together.

According to some aspects, the egg support assembly 130 may be self-adjusting to accommodate eggs of various sizes, as shown in FIGS. 9-12. In this regard, as shown in FIGS. 9-12, the egg support assembly 130 may include a biasing member 132 that allows for self-adjustment of the support member 145 depending on the size and weight of the egg being supported thereby. After the individual egg holder 140 has self-adjusted, the egg holder 140 may be locked into position using a locking assembly 150 configured to lockingly secure the egg holder in position for processing. The locking assembly 150 may be electrically, pneumatically, hydraulically, or mechanically operated or actuated. As shown in FIG. 11, the egg holder 140 may include a cylindrical sleeve 139 that moves vertically to accommodate various sizes of eggs. In one aspect, an inflatable member or bladder 133 may be inflated or expanded pneumatically such that the inflatable bladder 133 contacts the interior walls of the cylindrical sleeve 139 to lock the support member 145 in position.

In one aspect, as shown in FIGS. 9 and 12, the egg holder 140 may include the support member 145, the biasing member 132, a collet vise 134, a guide rod 136, and a clamping collet 138. The collet vise 134 defines an internal tapering wall 135 configured to receive a cooperatively tapering section 137 of the clamping collet 138. In this regard, when the collet vise 134 and the clamping collet 138 interact, the tapering section 137 of the clamping collet 138 tightens about the guide rod 136 to lock the egg holder 140 in position.

In some instances, as shown in FIG. 18, the egg support assembly 130 may include a plurality of rotation devices 300 movable with respect to the egg holders 140. In this regard, the eggs may be rotated as they are lifted from the egg flat. Such rotation may assist in the orienting function described herein and assist in guiding the eggs into the orienting accommodations described below. In some instances, the rotation devices 300 may travel along tracks 302 about the egg holders 140, sometimes in a helical manner and along a helical path. Each rotation device 300 may include a plurality of support extensions 310 extending from a base 304. The support extensions 310 may physically contact the egg so as to provide lateral support thereto. In some instances, the support extensions 310 may lift the egg out of engagement with the support member 145 such that the rotation device is lifting and rotating the egg simultaneously.

As shown in FIGS. 1 and 2, the egg orienting assembly 125 may generally include a reference platform 160, which may in some instances be a plate 165. The reference platform 160 may be configured to remain stationary or may otherwise be movable. The referencing of each egg 5 to a reference position may be carried out with a circular reference opening 162 formed in the reference plate 165. As shown in FIG. 2, an egg 5 may be lifted upwardly out of the egg flat container 20 into the reference opening 162 until the egg 5 contacts the opening 162, the opening 162 acting as a stop. The reference plate 160 may be made of any suitable material, such as stainless steel or a polymer or ceramic material. The reference plate 165 may be an integral single piece or may otherwise be separated into a plurality of individual plates collectively forming the reference plate 160.

Prior to reaching the reference platform 160, each egg lifted from the egg flat container 20 may engage, interact, or otherwise come into contact with an egg orienting accommodation, generally designated as 200. The egg orienting accommodation 200 may extend from the reference platform 160 so as to be positioned between the egg support assembly 130 and the reference platform 160. Each egg orienting accommodation 200 may be associated with a respective reference opening 162 such that as an egg moves toward the reference platform 160 it interacts with the egg orienting accommodation 200. In some instances, the egg orienting accommodation 200 may be configured to straighten and orient the egg vertically along a longitudinal axis 10 (FIG. 9) of the egg as defined by the ends of the egg. In this manner, any eggs positioned at an angle or tilted within the egg flat container 20 may be straightened or vertically aligned for processing. The egg orienting accommodation 200 may be directly or indirectly connected, attached, or coupled to the reference platform 160. As shown in FIGS. 1-5, the egg orienting accommodation 200 may be directly attached or otherwise integrated into the reference platform 160.

The egg orienting accommodation 200 may be capable of deflecting about the egg as the egg is received therein. In this regard, the egg orienting accommodation 200 may be formed of deflecting means or deflective members capable of deflecting about the egg and along the contours thereof in order to straighten the egg vertically.

The egg orienting accommodation 200 may be of unitary construction, while in some instances it may be formed of discrete components cooperating to form the egg orienting accommodation 200. According to some aspects, the egg orienting accommodation 200 may be formed of a pliant, flexible or resilient material so as to allow the egg orienting accommodation 200 to deflect about the egg when coming into contact therewith. The egg orienting accommodation 200 may be constructed from various materials that exhibit such deflective, elastic, or resilient qualities, such as, for example, resilient materials, elastic materials, super-elastic materials, pseudo-elastic materials, and shape memory materials. In some instances, the egg orienting accommodation 200 may be constructed of a shape-memory material (e.g., shape memory alloy or shape memory polymer) that have the ability to return from a deformed state (temporary shape) to their original (permanent) shape induced by an external stimulus such as temperature change. In other instances, the egg orienting accommodation 200 may be constructed of a super-elastic alloy (e.g., nickel titanium (nitinol)) that when deformed returns to its pre-deformed shape without external stimulus. When mechanically loaded, a super-elastic alloy deforms reversibly to very high strains (up to 10%) by the creation of a stress-induced phase. When the load is removed, the new phase becomes unstable and the material regains its original shape. Such super-elastic materials, pseudo-elastic materials, and shape memory materials provide the benefit of resisting fatigue, an important factor when considering the quantity of eggs processed through the system 100. In some instances, the egg orienting accommodation 200 may be constructed of metal alloys (e.g., stainless steel) or polymer components, or combinations thereof.

The egg orienting accommodation 200 may have various shapes, forms, or structures that permit the egg orienting accommodation 200 to straighten an egg vertically using physical contact. According to one particular aspect, the egg orienting accommodation 200 may be formed from a plurality of resilient members 210 extending from a body 250, as shown in FIGS. 6-8. The body 250 may then be attached, connected or coupled to the reference platform 160, and the body may define a hole 205 that allows the end of the egg to be accessed for processing. The resilient members 210 may cooperate to form an open-ended arrangement that allows an end of the egg to be easily received within the egg orienting accommodation 200. In some instances, the resilient members 210 may be in the form of wire loops forming a pliant wire structure in which the egg is received. In some instances, the various resilient members 210 may be integrally formed, while in other instances the resilient members 210 may be discrete components. The resilient members 210 may be capable of bending elastically to accommodate eggs of varying size. The resilient members 210 may follow the contour of the egg to straighten the egg as the egg is advanced into the egg orienting accommodation 200.

The configuration and elasticity of the egg orienting accommodation 200 may be such that the egg is not retained within the egg orienting accommodation 200 when the egg support assembly 130 is moved to its retracted position post-processing. In this manner, the egg should slide out of the egg orienting accommodation 200 as the egg holder 140 descends such that the egg is lowered back into its respective receptacle of the egg flat container 20. The egg flat container 20 may then be advanced from beneath the egg processing head and downstream of the egg processing system 100. In this regard, for minimizing fatigue failure, a shape memory or superelastic material of appropriate elasticity may be preferred since the egg orienting accommodation 200 will encounter a substantial quantity of processing events in any given commercial setting. The resiliency or elasticity of the egg orienting accommodation 200 may be such that the weight of the egg overcomes any urge for the egg to be retained within the egg orienting accommodation 200, thereby eliminating the need for a device capable of actively pushing the egg out of engagement with the egg orienting accommodation 200. In this regard, the egg orienting accommodation 200 may be configured as non-retaining in that the egg is not retained therewithin without assistance from the egg holder 140. The resilient members 210 of the egg orienting accommodation may be of any length needed in order to properly straighten the egg to a vertical orientation.

As shown in FIGS. 13 and 14, in some instances, the egg orienting accommodation 200 may be attached to, integral with, otherwise connected to an egg processing device such as an invasive egg processing device 500 as shown. In this particular example, the egg orienting accommodation 200 may be used in conjunction with the egg processing device 500 such that the eggs are oriented in a predetermined orientation prior to processing via an invasive procedure. For example, the invasive egg processing device 500 may include a body 502 generally having a distal end 504 and proximal end 506, with a needle capable of being extended and retracted at the distal end 504. The egg orienting accommodation 200 may also be positioned at the distal end 504 of the body 502 such that the egg is oriented (e.g., straightened) prior to the needle being inserted into the egg for delivery of a treatment substance (e.g., vaccine) thereinto or withdrawal of a sample therefrom.

In some instances, as illustrated in FIGS. 15-17, it may be desirable for processing purposes to orient the eggs off-axis with respect to vertical. That is, it may be desired to tilt the eggs from a vertical orientation. As such, the egg orienting accommodation may be appropriately configured to carry out such function. According to one aspect, the egg orienting accommodation 200 may include an orienting body 260 defining a concave or irregular recess 262 in which the egg may be received. The recess 262 may extend through the orienting body 260 such that an egg processing device (e.g., injection or sampling device) can access the egg 5 opposite the opening through which the egg 5 entered the orienting body 260. In some instances, the egg holder 140 may be off-center with respect to a central axis 264 defined by the egg orienting accommodation 200, as shown in FIG. 15. As the egg is lifted into the recess 262, the egg contacts an internal wall 266 of the orienting body 260 and re-orients itself according to the contours of the internal wall 266. Such off-axis orienting may be advantageous for targeting an entry point or zone into the egg. In other instances, the tilting of the egg may cause an air cell within the egg to become positioned at a desirable location for processing.

Many modifications and other aspects of the present disclosure set forth herein will come to mind to one skilled in the art to which this disclosure pertains having the benefit of the teachings presented in the foregoing descriptions and the associated drawings. Therefore, it is to be understood that the present disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An egg processing system, comprising:

a reference platform defining a plate with a plurality of reference openings therethrough, each reference opening being adapted for receiving at least a portion of an avian egg therein from an underside of the reference platform;

a plurality of egg holders for supporting eggs, each egg holder being configured to lift an egg toward a respective reference opening; and a plurality of egg orienting accommodations extending from the underside of the reference platform, each egg orienting accommodation being associated with a respective reference opening such that as an egg moves toward the reference platform it interacts with the egg orienting accommodation to orient the egg.

2. An egg processing system according to claim 1, wherein each egg orienting accommodation comprises a plurality of resilient members cooperating to form an open-ended arrangement through which the egg is capable of being received for straightening the egg vertically.

3. An egg processing system according to claim 2, wherein the resilient members are formed of a pliant wire structure.

4. An egg processing system according to claim 3, wherein the resilient members are formed of a shape-memory material.

5. An egg processing system according to claim 1, wherein each egg holder is configured to be self-adjusting such that the egg holder self-adjusts its height with respect to the reference platform based upon the size of the egg being lifted to the reference opening.

6. An egg processing system according to claim 1, wherein the egg holders are configured to helically rotate.

7. A method for processing an avian egg, the method comprising:

positioning a plurality of avian eggs beneath a reference platform defining a plate with a plurality of reference openings therethrough, the reference platform having a plurality of egg orienting accommodations extending from the underside of the reference platform;

lifting each avian egg to the reference platform with an egg holder such that each reference opening receives an avian egg therein from an underside of the reference platform;

orienting the eggs in a predetermined orientation as the eggs move upwardly to interact with the egg orienting accommodations and contact the reference platform;

processing the avian eggs; and lowering the egg holder such that each avian egg slides out of the respective egg orienting accommodations as the egg holder descends.

8. A method according to claim 7, wherein orienting the eggs further comprises straightening the eggs to a vertical orientation with the egg orienting accommodations comprising a plurality of resilient members cooperating to form an open-ended arrangement through which the egg is capable of being received.

9. A method according to claim 7, further comprising the step of self-adjusting a height of each egg holder with respect to the reference platform based upon the size of the egg being lifted to the reference opening.

10. A method according to claim 7, further comprising the step of rotating each avian egg as it is lifted to the reference platform.

* * * * *